US012601937B2

(12) United States Patent
McGowan et al.

(10) Patent No.: US 12,601,937 B2
(45) Date of Patent: Apr. 14, 2026

(54) THERMO-OPTIC PHASE SHIFTERS FOR A PHOTONICS CHIP

(71) Applicant: GlobalFoundries U.S. Inc., Malta, NY (US)

(72) Inventors: Brian McGowan, Waterbury, VT (US); Ping-Chuan Wang, Hopewell Junction, NY (US); Michal Rakowski, Ballston Lake, NY (US); Sujith Chandran, Clifton Park, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 271 days.

(21) Appl. No.: 18/200,643

(22) Filed: May 23, 2023

(65) Prior Publication Data

US 2024/0393624 A1    Nov. 28, 2024

(51) Int. Cl.
*G02F 1/01* (2006.01)

(52) U.S. Cl.
CPC ........ *G02F 1/0147* (2013.01); *G02F 2203/50* (2013.01)

(58) Field of Classification Search
CPC ........................... G02F 1/0147; G02F 2203/50
See application file for complete search history.

(56) References Cited

U.S. PATENT DOCUMENTS

| 7,335,862 | B2 * | 2/2008 | Takahashi | ................ | H05B 3/24 |
| | | | | | 338/10 |
| 9,946,099 | B2 * | 4/2018 | Gill | ........................ | G02B 6/136 |
| 10,197,819 | B2 * | 2/2019 | Gill | ........................ | G02B 6/136 |
| 10,203,525 | B2 * | 2/2019 | Gill | ........................ | G02F 1/0147 |
| 10,747,085 | B1 * | 8/2020 | Vidrighin | .............. | G02F 1/3138 |
| 11,314,143 | B2 * | 4/2022 | Vidrighin | .............. | G02B 6/354 |
| 11,409,139 | B2 * | 8/2022 | Kuo | ........................ | G02F 1/0147 |
| 11,502,480 | B2 * | 11/2022 | Pathak | .................... | H01S 5/068 |
| 11,621,249 | B2 * | 4/2023 | Or-Bach | ................. | H01L 24/08 |
| | | | | | 257/713 |
| 11,740,492 | B2 * | 8/2023 | Kuo | ........................ | G02F 1/0147 |
| | | | | | 385/1 |
| 11,782,323 | B2 * | 10/2023 | Vidrighin | ........... | G02B 6/12007 |
| | | | | | 385/50 |
| 12,142,893 | B2 * | 11/2024 | Pathak | ................ | H01S 5/02453 |
| 2006/0191900 | A1 * | 8/2006 | Takahashi | ............. | G02F 1/0147 |
| | | | | | 219/520 |
| 2008/0107370 | A1 * | 5/2008 | Takahashi | ............. | G02F 1/0147 |
| | | | | | 385/1 |

(Continued)

OTHER PUBLICATIONS

Mao et al., Heterogeneous silicon-on-lithium niobate electro-optic modulator for 100-Gbaud modulation. APL Photonics Dec. 1, 2022; 7 (12): 126103. https://doi.org/10.1063/5.0109251 (Year: 2022).*

(Continued)

*Primary Examiner* — Peter Radkowski

(74) *Attorney, Agent, or Firm* — Thompson Hine LLP; Anthony Canale

(57)    ABSTRACT

Structures for a thermo-optic phase shifter and methods of forming a thermo-optic phase shifter. The structure comprises an interconnect structure including a dielectric layer, a waveguide core on the dielectric layer, and a heater on the dielectric layer. The heater includes a resistive heating element positioned adjacent to the waveguide core.

20 Claims, 8 Drawing Sheets

(56) References Cited

U.S. PATENT DOCUMENTS

| | | | | |
|---|---|---|---|---|
| 2017/0248805 A1* | 8/2017 | Gill | | G02F 1/011 |
| 2017/0255031 A1* | 9/2017 | Gill | | G02B 6/132 |
| 2018/0143462 A1* | 5/2018 | Gill | | G02B 6/136 |
| 2021/0003903 A1* | 1/2021 | Vidrighin | | G02F 1/3132 |
| 2021/0181545 A1* | 6/2021 | Kuo | | G02F 1/2257 |
| 2021/0344166 A1* | 11/2021 | Pathak | | H01S 5/22 |
| 2021/0375829 A1* | 12/2021 | Or-Bach | | H01L 25/50 |
| 2022/0350177 A1* | 11/2022 | Kuo | | G02F 1/0147 |
| 2023/0047258 A1* | 2/2023 | Vidrighin | | G02F 1/3138 |
| 2023/0073927 A1* | 3/2023 | Pathak | | H01S 5/068 |
| 2023/0367145 A1* | 11/2023 | Kuo | | G02F 1/2257 |
| 2024/0302708 A1* | 9/2024 | Vidrighin | | G02B 6/12007 |
| 2024/0361663 A1* | 10/2024 | Vidrighin | | G02F 1/3138 |

OTHER PUBLICATIONS

Chang et al., Heterogeneous integration of lithium niobate and silicon nitride waveguides for wafer-scale photonic integrated circuits on silicon; Opt. Lett. 42, 803-806 (2017) (Year: 2017).*

S. Zhu et al., "An Improved Thermo-Optic Phase Shifter with AlN Block for Silicon Photonics," 2019 Optical Fiber Communications Conference and Exhibition (OFC), San Diego, CA, USA, 2019, pp. 1-3.

Zheng Yong et al., "Power-efficient silicon nitride thermo-optic phase shifters for visible light," Optics Express 30, 7225-7237 (2022).

Nicholas C. Harris et al., "Efficient, compact and low loss thermo-optic phase shifter in silicon," Optics Express 22, 10487-10493 (2014).

A. Masood et al., "Comparison of heater architectures for thermal control of silicon photonic circuits," 10th International Conference on Group IV Photonics, Seoul, Korea (South), 2013, pp. 83-84, doi: 10.1109/Group4.2013.6644437.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D Integrated Laser Attach Technology on a 300-mm Monolithic CMOS Silicon Photonics Platform," in EEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Mcgowan, Brian et al., "Thermo-Optic Phase Shifters" filed on Sep. 27, 2022 as a U.S. Appl. No. 17/953,804.

* cited by examiner

THERMO-OPTIC PHASE SHIFTERS FOR A PHOTONICS CHIP

BACKGROUND

The disclosure relates to photonics chips and, more specifically, to structures for a thermo-optic phase shifter and methods of forming a thermo-optic phase shifter.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

A thermo-optic phase shifter is an optical component can be used to modulate the phase of light propagating in a waveguide core. Heat is generated by a heater associated with the thermo-optic phase shifter and transferred from the heater to the waveguide core. The waveguide core is comprised of a material having a refractive index that varies with temperature, which is effective to alter the phase of light propagating in the waveguide core. The performance of a thermo-optic phase shifter may be contingent upon the efficient transport of heat from the heater to the waveguide core. The reliability of a thermo-optic phase shifter may be contingent upon various factors, such as resistance of the material of the heater to electromigration, that may limit the operating temperature.

Improved structures for a thermo-optic phase shifter and methods of forming a thermo-optic phase shifter are needed.

SUMMARY

In an embodiment of the invention, a structure for a thermo-optic phase shifter is provided. The structure comprises an interconnect structure including a dielectric layer, a waveguide core on the dielectric layer, and a heater on the dielectric layer. The heater includes a resistive heating element positioned adjacent to the waveguide core.

In an embodiment of the invention, a method of forming a structure for a thermo-optic phase shifter is provided. The method comprises forming a dielectric layer of an interconnect structure, forming a waveguide core on the dielectric layer, and forming a heater on the dielectric layer. The heater includes a resistive heating element positioned adjacent to the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
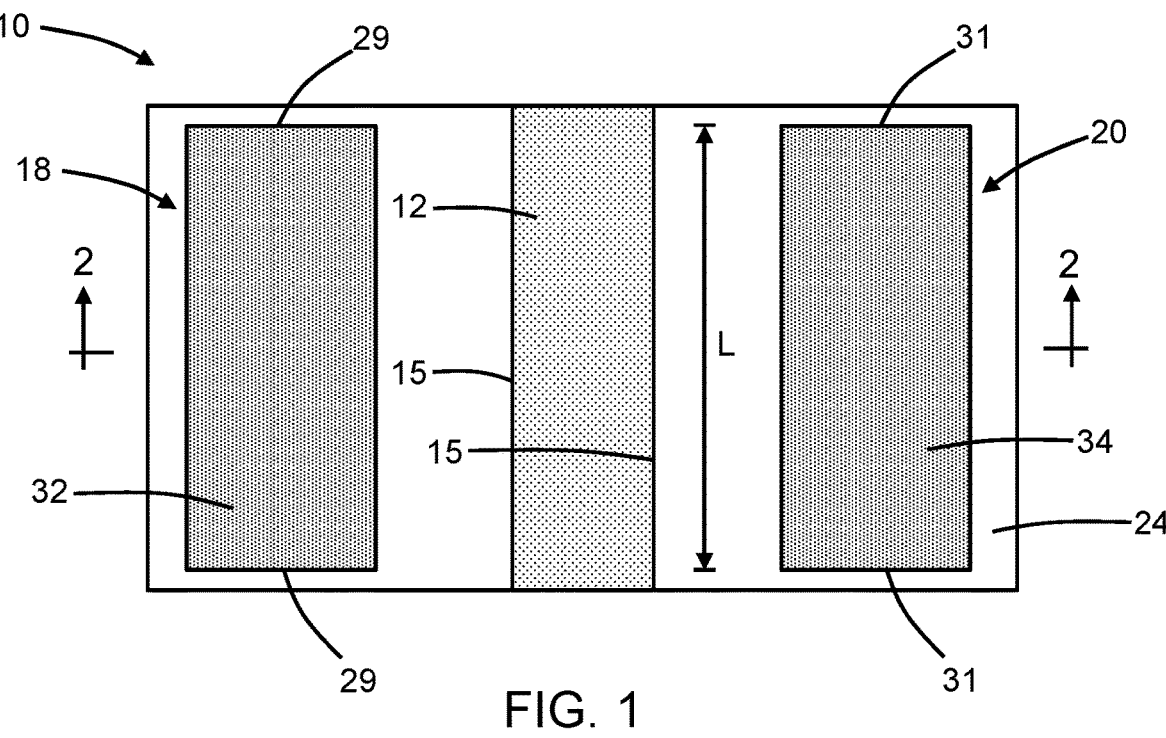
FIG. 1 is a top view of a structure at an initial fabrication stage of a processing method in accordance with embodiments of the invention.
Figure 2:
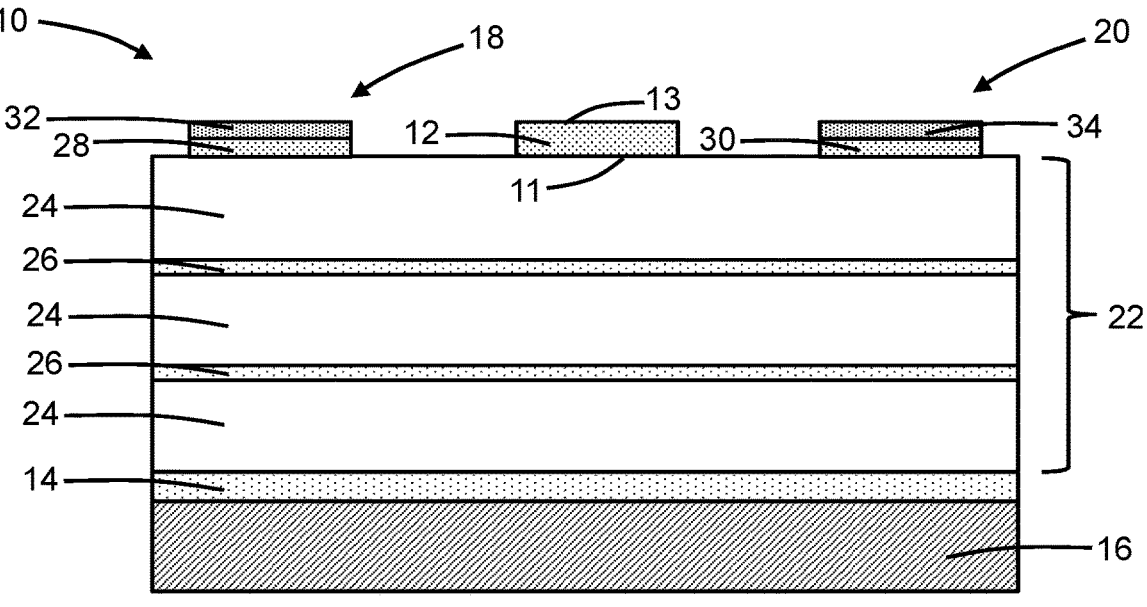
FIG. 2 is a cross-sectional view taken generally along line 2-2 in FIG. 1.

With reference to FIGS. 1, 2 and in accordance with embodiments of the invention, a structure 10 for a thermo-optic phase shifter includes a waveguide core 12, a heater 18, and a heater 20 that are disposed in an interconnect structure 22. The interconnect structure 22 is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate. The waveguide core 12 includes a lower surface 11, an upper surface 13, and opposite side surfaces 15 that join the lower and upper surfaces 11, 13. The heater 18 is positioned adjacent to one of the side surfaces 15 of the waveguide core 12, and the heater 20 is positioned adjacent to the opposite side surface 15 of the waveguide core 12.

In an embodiment, the waveguide core 12 may be comprised of a material having a refractive index that is greater than the refractive index of silicon dioxide. In an embodiment, the waveguide core 12 may be comprised of a dielectric material, such as silicon nitride, silicon oxynitride, or aluminum nitride. In an alternative embodiment, the waveguide core 12 may be comprised of a semiconductor material, such as polycrystalline silicon (i.e., polysilicon) or amorphous silicon. In an embodiment, the waveguide core 12 may be formed by depositing a layer comprised of its constituent material (e.g., silicon nitride) and patterning the deposited layer with lithography and etching processes.

The interconnect structure 22 may include interlayer dielectric layers 24 and intralayer dielectric layers 26 that are arranged in a heterogenous layer stack formed on the dielectric layer 14 and substrate 16. Each intralayer dielectric layer 26 may be disposed between an adjacent pair of the interlayer dielectric layers 24. The interlayer dielectric layers 24 may be comprised of a dielectric material, such as silicon dioxide, tetraethylorthosilicate silicon dioxide, fluorinated-tetraethylorthosilicate silicon dioxide, or low-k SiCOH, that is an electrical insulator. The intralayer dielectric layers 26 may be comprised of a dielectric material, such as silicon nitride, nitrogen-doped silicon carbide, or nitrogen-doped hydrogenated silicon carbide, that is an electrical insulator and that has a different composition than the interlayer dielectric layers 24. The interlayer dielectric layers 24 and intralayer dielectric layers 26 are positioned in elevation between the substrate 16 and the waveguide core 12 and heaters 18, 20. In an embodiment, the waveguide core 12 and heaters 18, 20 may be formed in the interconnect structure 22 by back-end-of-line processing. In an embodiment, the waveguide core 12 and heaters 18, 20 may be formed in the interconnect structure 22 by a combination of middle-of-line processing and back-end-of-line processing. In an embodiment, the formation of the waveguide core 12 and heaters 18, 20 does not involve front-end-of-line processing.

The heater 18 includes a strip 28 comprised of a dielectric material and a layer 32 defining a resistive heating element that is disposed on the strip 28. The heater 20 includes a strip 30 comprised of a dielectric material and a layer 34 defining a resistive heating element that is disposed on the strip 30. In an embodiment, the waveguide core 12 and the strips 28, 30 may adjoin the underlying interlayer dielectric layer 24. In an embodiment, the layers 32, 34 may adjoin the dielectric material of the strips 28, 30 in a directly contacting arrangement. In an embodiment, the waveguide core 12 and strips 28, 30 may be positioned on a planar top surface of the underlying interlayer dielectric layer 24. The strips 28, 30 are positioned between the layers 32, 34 and the underlying interlayer dielectric layer 24. The waveguide core 12 is laterally positioned between the layer 32 and the layer 34 in respective spaced-apart relationships. In an embodiment, the waveguide core 12 may be symmetrically positioned in a lateral direction between the layer 32 and the layer 34.

The strip 28 may have opposite ends 29, and the strip 30 may have opposite ends 31. The strips 28, 30 may have a length L between the respective opposite ends 29, 31. The strips 28, 30 may be aligned lengthwise parallel to the adjacent portion of the waveguide core 12. In an embodiment, the layer 32 may cover an entirety of the upper surface of the strip 28. In an embodiment, the layer 32 may extend from one of the ends 29 of the strip 28 to the opposite end 29 of the strip 28. In an embodiment, the layer 34 may cover an entirety of the upper surface of the strip 30. In an embodiment, the layer 34 may extend from one of the ends 31 of the strip 30 to the opposite end 31 of the strip 30.

In an embodiment, the strips 28, 30 may be formed of the same dielectric material as the intralayer dielectric layers 26. In an embodiment, the waveguide core 12 may be comprised of the same dielectric material as the strips 28, 30. In an embodiment, the waveguide core 12 may be comprised of a different dielectric material than the strips 28, 30. The strips 28, 30 may be formed by patterning a layer of their dielectric material by lithography and etching processes. In an embodiment, the waveguide core 12 may be formed on one of the interlayer dielectric layers 24 in a space from which the intralayer dielectric layer 26 is removed by patterning.

In an embodiment, the layers 32, 34 may be comprised of tantalum nitride or titanium nitride that is patterned by lithography and etching processes. Resistive heating elements comprised of tantalum nitride or titanium nitride have a higher resistance to electromigration than other materials, such as a metal silicide or copper. In an alternative embodiment, the layers 32, 34 may be comprised of another material with performance that is comparable to tantalum nitride and titanium nitride.

Figure 3:
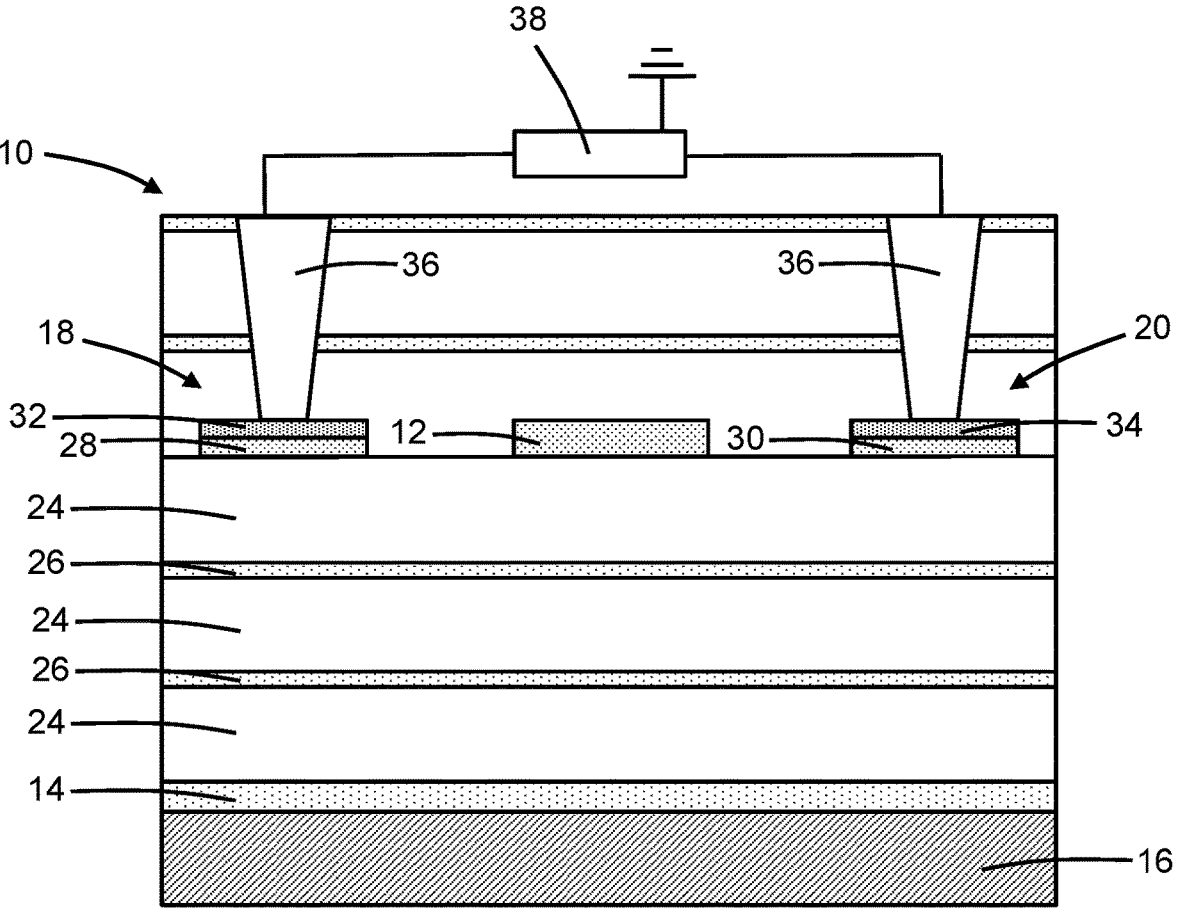
FIG. 3 is a cross-sectional view of the structure at a fabrication stage of the processing method subsequent to FIGS. 1, 2.

With reference to FIG. 3 in which like reference numerals refer to like features in FIGS. 1, 2 and at a subsequent fabrication stage, additional interlayer dielectric layers 24 and intralayer dielectric layers 26 may be formed over the waveguide core 12 and the heaters 18, 20. In an embodiment, the interlayer dielectric layer 24 over the waveguide core 12 and heaters 18, 20 may be deposited and then planarized by chemical-mechanical polishing to remove topography. The waveguide core 12 and the heaters 18, 20 may be embedded in the dielectric material of the overlying interlayer dielectric layer 24 such that a portion of the interlayer dielectric layer 24 is disposed in a lateral direction between the waveguide core 12 and the heater 18, and another portion of the interlayer dielectric layer 24 is disposed in a lateral direction between the waveguide core 12 and the heater 20.

Contacts 36 are formed that are physically and electrically connected to the layers 32, 34. The contacts 36 may be comprised of a metal, such as tungsten, that is formed in openings patterned in the interlayer dielectric layers 24 and intralayer dielectric layers 26. The contacts 36 may connect the layers 32, 34 to a power source 38 that can be operated as a power supply to provide a current that causes Joule heating of the layers 32, 34 such that the layers 32, 34 can generate heat, which is transferred to the waveguide core 12. In an alternative embodiment, the contacts 36 may be comprised of a different metal, such as copper or aluminum.

In use, the power source 38 is operated to supply a current that causes Joule heating of the layers 32, 34. The heat generated by the layers 32, 34 is transferred to the waveguide core 12 through thermal paths that include the intervening portions of the interlayer dielectric layer 24. The temperature of the waveguide core 12 is elevated by the transferred heat. A temperature gradient exists across the thermal paths with the waveguide core 12 being cooler than the layers 32, 34. The temperature increase experienced by the waveguide core 12 is effective to change the refractive index of the material constituting the waveguide core 12 and to thereby alter the phase of light propagating in the waveguide core 12.

The heaters 18, 20, which are positioned in the interconnect structure 22, enable efficient thermal tuning of the refractive index of the waveguide core 12, which is also positioned in the interconnect structure 22. The layers 32, 34 providing the resistive heating elements of the heaters 18, 20 are robust to electromigration and capable of operation at a higher temperature than other metals, such as copper.

Figure 4:
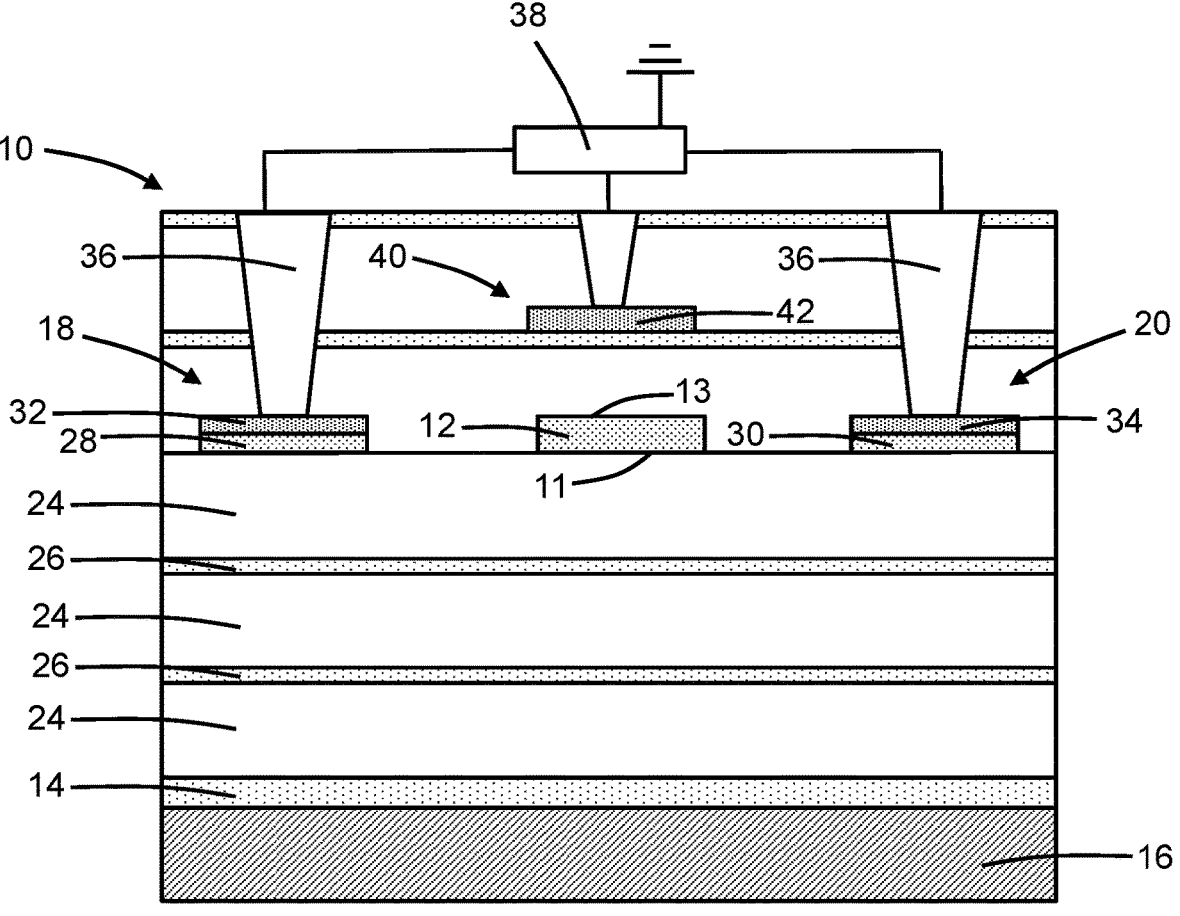
FIG. 4 is a cross-sectional view of a structure in accordance with alternative embodiments of the invention.

With reference to FIG. 4 in which like reference numerals refer to like features in FIG. 3 and in accordance with alternative embodiments, the structure 10 may be modified to add a heater 40 that is disposed over the waveguide core 12. In particular, the heater 40 is positioned above the upper surface 13 of the waveguide core 12. The waveguide core 12 is positioned in a vertical direction between the heater 40 and the substrate 16. In an embodiment, the heater 40 may include a layer 42 defining a resistive heating element that is positioned on one of the intralayer dielectric layers 26 over the waveguide core 12. A portion of one of the interlayer dielectric layers 24 is positioned in a vertical direction between the waveguide core 12 and the heater 40. The layer 42 of the heater 40 may be connected by the contacts 36 to the power source 38. The addition of the heater 40 may improve the flexibility for the thermal tuning of the refractive index of the waveguide core 12.

Figure 5:
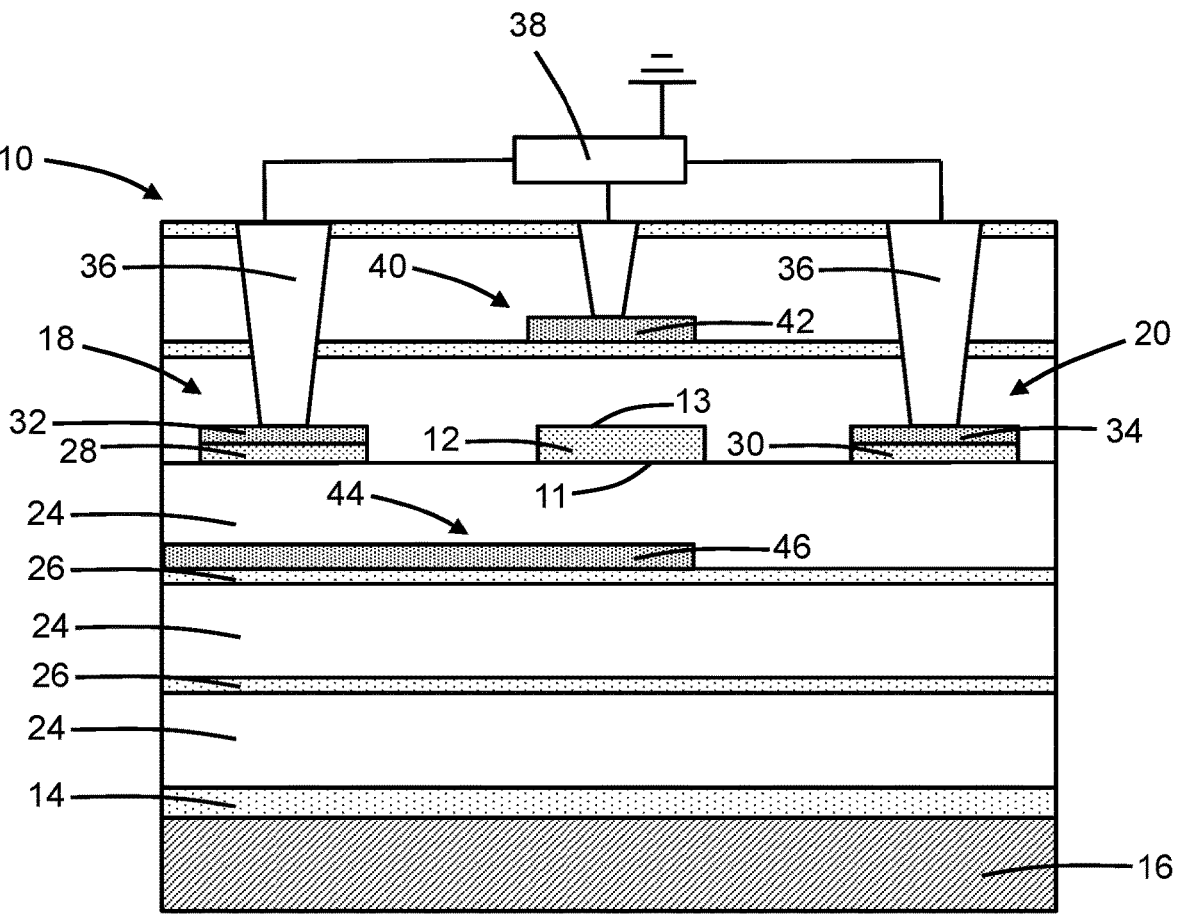
FIG. 5 is a cross-sectional view of a structure in accordance with alternative embodiments of the invention.

With reference to FIG. 5 in which like reference numerals refer to like features in FIG. 4 and in accordance with alternative embodiments, the structure 10 may be modified to add a heater 44 that is disposed under the waveguide core 12. In particular, the heater 44 is positioned in a vertical direction under the lower surface 11 of the waveguide core 12 and between the waveguide core 12 and the substrate 16. The heater 44 may include a layer 46 defining a resistive heating element that is positioned on one of the intralayer dielectric layers 26 under the waveguide core 12. The layer 46 may be extend laterally beneath, for example, the heater 18 in order to be electrically coupled to the power source 38. The heater 44 may be embedded in the dielectric material of the surrounding interlayer dielectric layer 24 such that a portion of one of the interlayer dielectric layers 24 is disposed between the waveguide core 12 and the heater 44. The addition of the heater 44 may improve the flexibility for the thermal tuning of the refractive index of the waveguide core 12.

Figure 6:
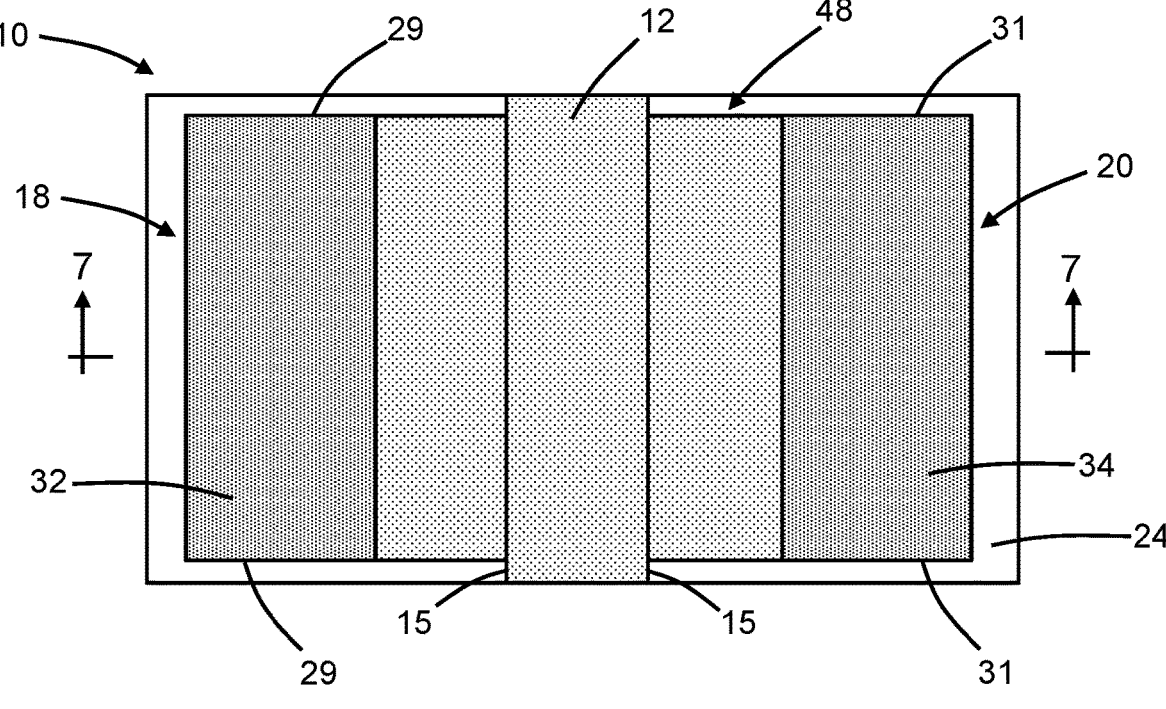
FIG. 6 is a top view of a structure at an initial fabrication stage of a processing method in accordance with embodiments of the invention.
Figure 7:
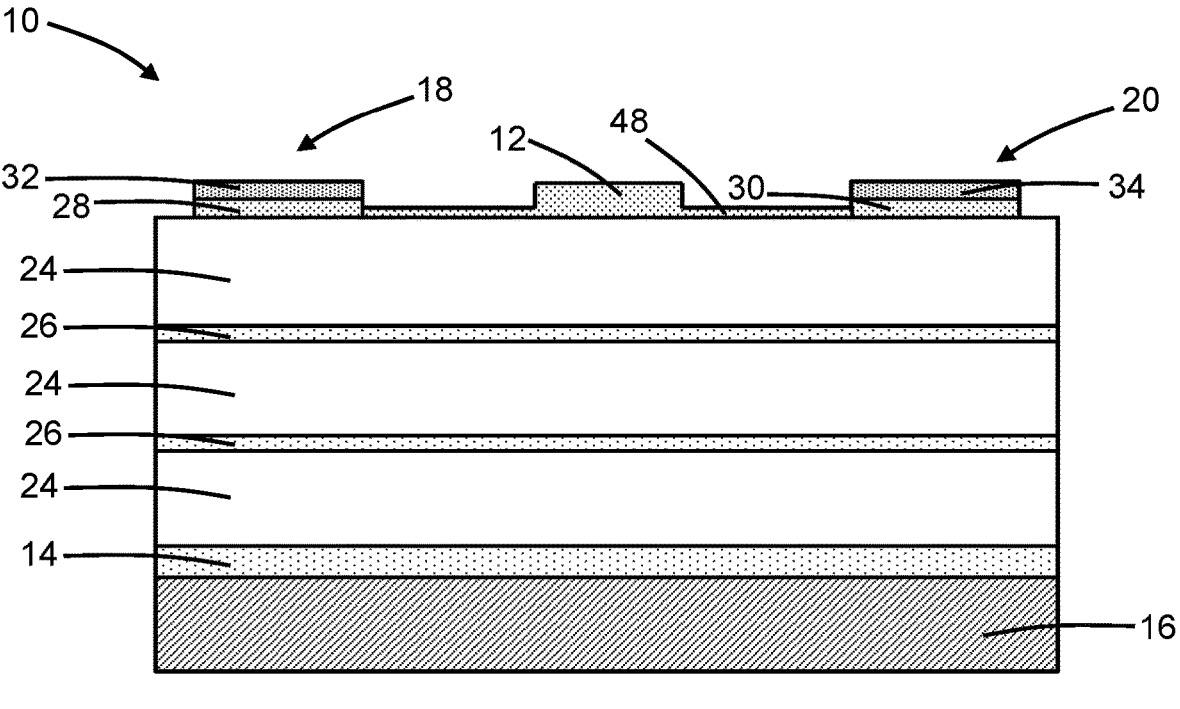
FIG. 7 is a cross-sectional view taken generally along line 7-7 in FIG. 6.

With reference to FIGS. 6, 7 in which like reference numerals refer to like features in FIG. 3 and in accordance with alternative embodiments, the waveguide core 12 may be physically connected to each of the strips 28, 30 by a slab layer 48. In an embodiment, the slab layer 48 may be formed by partially etching through the layer of material that is patterned to form the waveguide core 12 and/or the strips 28, 30. The slab layer 48 has a thickness that is less than the thickness of the waveguide core 12 and the strips 28, 30. The slab layer 48 connects a lower portion of the waveguide core 12 at the opposite side surfaces 15 to a lower portion of the strip 28 and a lower portion of the strip 30. The slab layer 48 may be in direct contact with the underlying interlayer dielectric layer 24. In an embodiment, the slab layer 48 may extend lengthwise from one of the ends 29 of the strip 28 to the opposite end 29 of the strip 28. In an embodiment, the slab layer 48 may extend lengthwise from one of the ends 31 of the strip 30 to the opposite end 31 of the strip 30. In an alternative embodiment, the slab layer 48 may extend past the ends 29 of the strip 28 and the ends 31 of the strip 30.

Figure 8:
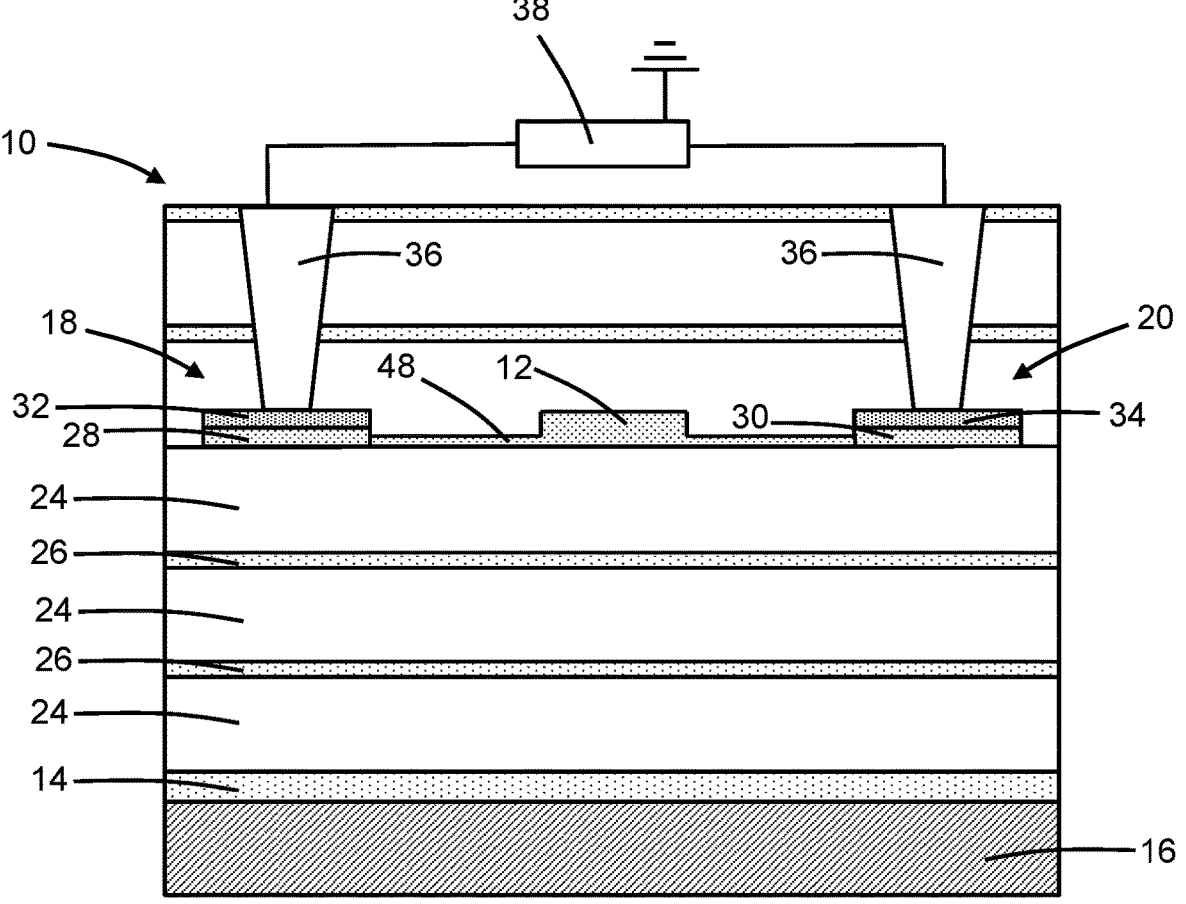
FIG. 8 is a cross-sectional view of the structure at a fabrication stage of the processing method subsequent to FIGS. 6, 7.

With reference to FIG. 8 in which like reference numerals refer to like features in FIGS. 6, 7 and at a subsequent fabrication stage, the additional interlayer dielectric layers 24 and intralayer dielectric layers 26 may be formed, as well as the contacts 36 that are connected to the power source 38. The slab layer 48 may increase the efficiency of heat transfer from the heaters 18, 20 to the waveguide core 12 during operation of the thermo-optic phase shifter. For example, the slab layer 48 may be comprised of a dielectric material having a higher coefficient of thermal conductivity than dielectric material of the interlayer dielectric layers 24. In an embodiment, the slab layer 48 may be comprised of silicon nitride having a coefficient of thermal conductivity equal to about 30 W/(m*K), and the interlayer dielectric layers 24 may be comprised of low-K SiCOH having a coefficient of thermal conductivity equal to about 0.6 W/(m*K). The increased efficiency for heat transport may increase the maximum achievable temperature of the waveguide core 12 when transporting heat to the waveguide core 12, as well as increase the bandwidth of the thermo-optic phase shifter because of more efficient lowering of the temperature when transporting heat away from the waveguide core 12.

Figure 9:
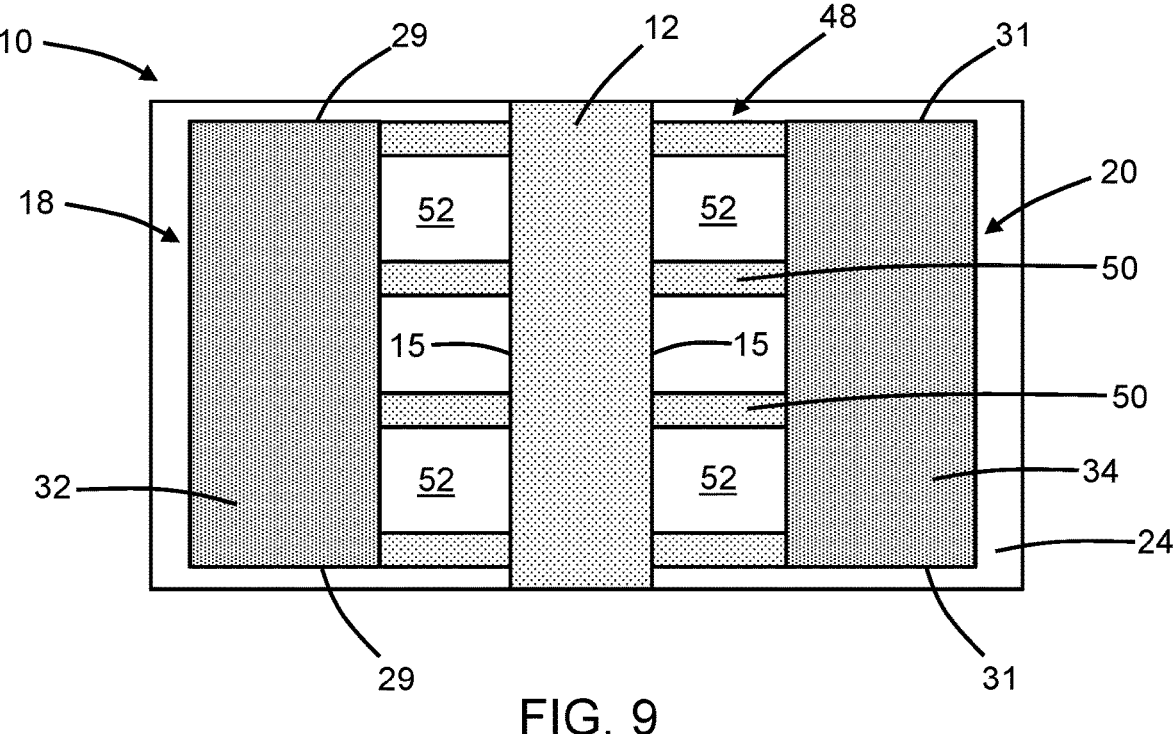
FIG. 9 is a top view of a structure in accordance with alternative embodiments of the invention.

With reference to FIG. 9 in which like reference numerals refer to like features in FIG. 6 and in accordance with alternative embodiments, the slab layer 48 may be patterned to include sections 50 that physically connect the waveguide core 12 to each of the strips 28, 30. In that regard, the sections 50 of the slab layer 48 connecting the waveguide core 12 to the strip 28 are spaced between the ends 29 of the strip 28, and the sections 50 of the slab layer 48 connecting the waveguide core 12 to the strip 30 are spaced between the ends 31 of the strip 30. The sections 50 of the slab layer 48 alternative along the length L (FIG. 1) of the strips 28, 30 with open spaces that expose sections 52 of the top surface of the interlayer dielectric layer 24 between adjacent pairs of the sections 50. The physical connection between the slab layer 48 and the strips 28, 30 of the heaters 18, 20 is discontinuous due to the sectioning of the slab layer 48. The sections 50 may be formed during the lithography and etching processes used to form the slab layer 48.

Processing continues as previously described to complete the structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a thermo-optic phase shifter, the structure comprising:

an interconnect structure including a first dielectric layer and a second dielectric layer on the first dielectric layer;

a waveguide core on the first dielectric layer;

a first heater on the first dielectric layer, the first heater including a first resistive heating element;

a second heater on the first dielectric layer, the second heater including a second resistive heating element, and the waveguide core laterally between the first resistive heating element and the second resistive heating element; and a third heater on the second dielectric layer, the third heater including a third resistive heating element over the waveguide core.

2. The structure of claim 1 wherein the waveguide core comprises silicon nitride, and the first resistive heating element, the second resistive heating element, and the third resistive heating element comprise tantalum nitride or titanium nitride.

3. The structure of claim 1 further comprising:

a slab layer that physically connects the waveguide core to the first heater, wherein the slab layer is thinner than the waveguide core, and the slab layer is disposed on the first dielectric layer.

4. The structure of claim 3 wherein the first heater includes a strip that is connected by the slab layer to the waveguide core, the strip is positioned between the first resistive heating element and the first dielectric layer, and the strip comprises a dielectric material.

5. The structure of claim 4 wherein the strip has a first end and a second end opposite to the first end, and the slab layer extends from the first end of the strip to the second end of the strip.

6. The structure of claim 5 wherein the slab layer includes a plurality of sections that are spaced apart between the first end of the strip and the second end of the strip, and each section of the slab layer is configured to couple a section of the waveguide core to a section of the first heater.

7. The structure of claim 6 wherein the waveguide core is disconnected from the first heater between adjacent pairs of the sections of the slab layer to define spaces, and the first dielectric layer is revealed in the spaces.

8. The structure of claim 1 wherein the first heater includes a strip comprising a first dielectric material, the first resistive heating element comprises a layer on the strip, and the strip is positioned between the layer and the first dielectric layer.

9. The structure of claim 8 wherein the waveguide core comprises the first dielectric material.

10. The structure of claim 8 wherein the waveguide core comprises a second dielectric material different from the first dielectric material.

11. The structure of claim 8 wherein the strip and the layer are lengthwise aligned parallel to the waveguide core.

12. The structure of claim 1 wherein the second dielectric layer includes a first portion positioned between the waveguide core and the first heater, a second portion positioned between the waveguide core and the second heater, and a third portion positioned between the waveguide core and the third heater.

13. The structure of claim 1 further comprising:

a substrate; and a fourth heater including a fourth resistive heating element, wherein the fourth heater is positioned between the substrate and the waveguide core.

14. A method of forming a structure for a thermo-optic phase shifter, the method comprising:

forming an interconnect structure including a first dielectric layer and a second dielectric layer on the first dielectric layer;

forming a waveguide core on the first dielectric layer;

forming a first heater on the first dielectric layer, wherein the first heater includes a first resistive heating element positioned adjacent to the waveguide core;

forming a second heater on the first dielectric layer, wherein the second heater includes a second resistive heating element, and the waveguide core is positioned laterally between the first resistive heating element and the second resistive heating element; and forming a third heater on the second dielectric layer, wherein the third heater includes a third resistive heating element over the waveguide core.

15. The structure of claim 13 wherein the waveguide core comprises silicon nitride, and the first resistive heating element, the second resistive heating element, the third resistive heating element, and the fourth resistive heating element comprise tantalum nitride or titanium nitride.

16. The structure of claim 3 wherein the slab layer physically connects the waveguide core to the second heater.

17. The structure of claim 1 further comprising:

a silicon-on-insulator substrate including a substrate comprising a semiconductor material and a third dielectric layer on the substrate, wherein the interconnect structure is positioned on the third dielectric layer.

18. The structure of claim 17 wherein the third dielectric layer is a buried oxide layer.

19. The structure of claim 18 wherein the interconnect structure includes a fourth dielectric layer between the first dielectric layer and the buried oxide layer.

20. The structure of claim 17 wherein the interconnect structure includes a fourth dielectric layer between the first dielectric layer and the third dielectric layer.

* * * * *